(12) United States Patent
Sun et al.

(10) Patent No.: US 11,333,870 B2
(45) Date of Patent: May 17, 2022

(54) LARGE-ANGLE OPTICAL RASTER SCANNING SYSTEM FOR DEEP TISSUE IMAGING

(71) Applicant: NATIONAL TAIWAN UNIVERSITY, Taipei (TW)

(72) Inventors: Chi-Kuang Sun, Fremont, CA (US); Bhaskar Jyoti Borah, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 260 days.

(21) Appl. No.: 16/702,551

(22) Filed: Dec. 4, 2019

(65) Prior Publication Data
US 2021/0173189 A1 Jun. 10, 2021

(51) Int. Cl.
*G02B 21/00* (2006.01)
*G01N 21/64* (2006.01)
*G02B 21/02* (2006.01)

(52) U.S. Cl.
CPC ......... *G02B 21/0048* (2013.01); *G01N 21/64* (2013.01); *G02B 21/0032* (2013.01); *G02B 21/0072* (2013.01); *G02B 21/0076* (2013.01); *G02B 21/02* (2013.01); *G01N 2201/068* (2013.01); *G01N 2201/06113* (2013.01)

(58) Field of Classification Search
CPC ............ G02B 21/0048; G02B 21/0032; G02B 21/0072; G02B 21/0076; G02B 21/02; G01N 21/64; G01N 2201/06113; G01N 2201/068
See application file for complete search history.

(56) References Cited

U.S. PATENT DOCUMENTS

2018/0106729 A1* 4/2018 Balu .................... A61B 5/0082
2019/0317078 A1* 10/2019 Yuan .................. A61K 49/0034

OTHER PUBLICATIONS

Diaspro et al. "Confocal Microscopy", Leica Microsystems CMS GmbH, 2008, p. 1-64. (Year: 2008).*

* cited by examiner

*Primary Examiner* — David P Porta
*Assistant Examiner* — Mamadou Faye
(74) *Attorney, Agent, or Firm* — Hannah Tien

(57) ABSTRACT

The field of view (FOV) of a nonlinear optical microscope (NLOM) is expected to be large enough for employing high-speed raster scanning on a mesoscale volumetric biological sample. Concurrently, three-dimensional (3D) visualization of fine sub-micron biological structures requires high enough lateral and axial resolutions, enforcing a high numerical aperture (NA) objective lens to be employed, thereby limiting the FOV of an NLOM. The invention is directed to a laser scanning NLOM, or to a large-angle optical raster scanning system, for deep biological tissue imaging with a large FOV of more than one square millimeter, up to 1.6×1.6 $mm^2$, while simultaneously maintaining a sub-femtoliter effective 3D resolution by means of a high-NA and low magnification objective lens and further maintaining a high acquisition speed with synchronized sampling, limited by the repetition rate of a high repetition rate pulsed laser source, thereby exceeding Nyquist Criterion for resolving micro-optical resolution throughout a horizontal FOV of more than one millimeter.

19 Claims, 13 Drawing Sheets
(10 of 13 Drawing Sheet(s) Filed in Color)

Ｕ S 11,333,870 B2

LARGE-ANGLE OPTICAL RASTER SCANNING SYSTEM FOR DEEP TISSUE IMAGING

BACKGROUND OF THE INVENTION

Deep-penetration capability of a Nonlinear Optical Microscope (NLOM) makes it suitable for three-dimensional (3D) imaging compared to CCD-based and single-photon imaging systems. To employ high-speed raster scanning on a mesoscale volumetric biological sample, the field of view (FOV) of an NLOM is expected to be large enough. However, to extend the FOV of an NLOM, either an increased scanning angle or usage of low magnification and low numerical aperture (NA) objective, both degrade image quality in terms of optical resolution. On the contrary, 3D visualization of fine sub-micron biological structures requires high enough lateral and axial resolutions, enforcing a high-NA objective to be employed, and furthermore, the extended FOV must be resolved by high-speed sampling fulfilling Nyquist-Criterion, thereby making FOV-extension beyond one square millimeter with sub-femtoliter effective 3D resolution, while not compromising with the acquisition speed, a challenging task.

Several techniques have been previously reported for mesoscale imaging. Balu, Mihaela et. al., "Imaging Platform Based on Nonlinear Optical Microscopy for Rapid Scanning Large Areas of Tissue," Pat. Publication No: WO 2018/075562 A1, discloses a nonlinear optical (NLO) microscope design with extended FOV of 0.8×0.8 mm$^2$=0.64 mm$^2$, i.e., less than one square millimeter, resolved by a pixel number of 1600×1600, thereby being unable to fulfil Nyquist Criterion for a sub-micron lateral resolution of 0.5±0.2 μm across the complete FOV of 0.8×0.8 mm$^2$, with a pixel size of 0.5 μm. Quite a few researchers have disclosed several NLOMs extending the FOV up-to several square millimeters by means of employing low-NA (≤0.6) objectives, thus leading to poor axial resolution (and hence, poor 3D resolution), due to the fact that axial resolution has inverse square dependence on numerical aperture (NA) of the objective lens.

Jonathan R. Bumstead et al., "Designing a large field-of-view two-photon microscope using optical invariant analysis," Neurophoton. 5(2), 025001 (2018), DOI: 10.1117/1.NPh.5.2.025001, discloses a two-photon microscope using optical invariant analysis, yielding a FOV of 7 mm in diameter with lateral and axial resolutions of ~1.7 μm and ~28 μm, respectively, achieved by a 4×, 0.22 NA objective. Besides, to resolve a lateral resolution of ~1.7 μm across a FOV of 7 mm in diameter, i.e., a square-FOV of 4.95×4.95 mm$^2$, a pixel number of more than 5800×5800 is required by Nyquist Criterion, however, they are limited by data acquisition speed of 1 M samples per second.

Shin-Ichiro Terada et al., "Super-wide-field two-photon imaging with a micro-optical device moving in post-objective space", Nature Communications (2018) 9:3550, DOI: 10.1038/s41467-018-06058-8, discloses a two-photon imaging system using micro-opto-mechanical device within post-objective space, leading to a FOV of 1.2×3.5 mm$^2$, being stitched together using sequential imaging of multiple distant areas (>6 mm), with lateral resolutions of 1.26±0.03 μm for the X-axis direction and 0.88±0.07 μm for the Y-axis direction, and axial resolution of 9.96±0.12 μm, achieved by a 10×, 0.6 NA objective lens, further limited by data acquisition speed.

Consequently, the prior arts are limited by either less than one square millimeter FOV, or poor axial resolution, and/or slower data acquisition speed to fulfil Nyquist Criterion, and hence, are not suitable candidate for high-resolution 3D imaging with sub-femtoliter Nyquist-fulfilled effective 3D resolution across a FOV of more than one square millimeter.

It is desired in the art to provide an NLOM to overcome the problems as stated above.

SUMMARY OF THE INVENTION

The invention is intended to provide a large-angle optical raster scanning system for deep tissue imaging with an extended FOV of more than one square millimeter, while simultaneously maintaining a high effective 3D resolution resolved by a high-speed data acquisition system exceeding Nyquist Criterion for the complete FOV. While doing so, to not compromise with the speed, each voxel acquisition is synchronized to each optical pulse from a pulsed laser source with a high repetition rate, thereby pushing the acquisition speed to the maximum, i.e., limited by the repetition rate of the pulsed laser source. The invention employs a high-NA and low magnification objective lens with resolution being uncompromised. In order to extend the FOV beyond one square millimeter, a specific optical design is invented supporting large scanning angle in both fast-X and slow-Y axes, while maintaining low optical aberrations across the FOV While extending the scanning angle (and thereby the FOV), the nonlinear speed of a resonant scanning mirror leads to image distortion along the fast X-axis, enforcing one to sample at non-equidistant time points maintaining uniform pixel rate and thereby resulting in lower pixel number, insufficient to fulfil Nyquist Criterion for large FOV with micro-optical resolution. The invention implicates Nyquist-exceeded sampling throughout the scanning range at equidistant time points and subsequently fixes resonant scanner induced distortions in real time by means of a graphics processing unit (GPU)-accelerated interpolation algorithm; while collecting a larger number of data points near the edges compared to the center of the FOV (due to equidistant sampling throughout the nonlinear motion of the resonant scanning mirror), further compensate for vignetting-induced reduced signal strength near the FOV edges due to limited field number of the objective lens.

According to the invention, to solve the above-mentioned problems encountered in the existing art, a large-angle optical raster scanning system for high-speed deep tissue imaging, being provided with field of view (FOV) of at least one square millimeter with sub-femtoliter effective 3D resolution resolved by Nyquist-exceeded synchronized sampling is disclosed, comprising:

one or more, i.e., 1st to n$^{th}$, pulsed laser source(s) for emitting one or more laser beams with central wavelengths of $\lambda_n$ and a Nyquist-exceeding repetition rate of $R_n \geq A_n \times N_n$ for the n$^{th}$ pulsed laser source, where $A_n$ is a Nyquist-limited sampling rate given by 4 times the horizontal FOV multiplied by a resonant scanner frequency divided by theoretical objective-limited lateral resolution, for resolving micro-optical resolution across a horizontal FOV of >1 mm, and $N_n$ is an integer ≥1 signifying a number of laser pulse(s) per voxel;

a resonant scanning mirror optically coupled to the one or more pulsed laser source(s);

a galvanometer scanning mirror optically coupled to the resonant scanning mirror;

a scan lens optically coupled to the galvanometer scanning mirror;

a dedicated tube lens, comprising three plano-convex lenses, each with an effective focal length of 500 mm, combined together and optically coupled to the scan lens;

a high-NA (numerical aperture) and low magnification objective lens optically coupled to the dedicated tube lens for raster scanning a volumetric tissue-sample and for collecting a sample-generated fluorescence signal which is guided to a photomultiplier tube (PMT) to produce an electrical signal; and a data acquisition system coupled to receive the electrical signal from the PMT with each sampling event synchronized to each optical pulse either from the one pulsed laser source, or from the highest repetition rate pulsed laser source, in case of one, or more pulsed laser source(s), respectively, wherein the scan lens and the dedicated tube lens constitute a beam expander with low magnification, thereby maximizing the field of view (FOV), but concurrently providing an enlarged beam size over a back aperture of the high-NA and low magnification objective lens to maintain high excitation-NA, and thereby high resolution.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Table 1. shows performance of a data acquisition system with full-field beyond-Nyquist resolvability according to the invention.

Table 2. shows comparison of a data acquisition system with a state-of-the-art system (Leica SP8 Confocal).

Table 3. shows software dependency and pre-requisite hardware for a C++ based GPU-accelerated control and acquisition software according to the invention.

DETAILED DESCRIPTION OF THE PREFERRED EMBODIMENTS

Figure 1A:
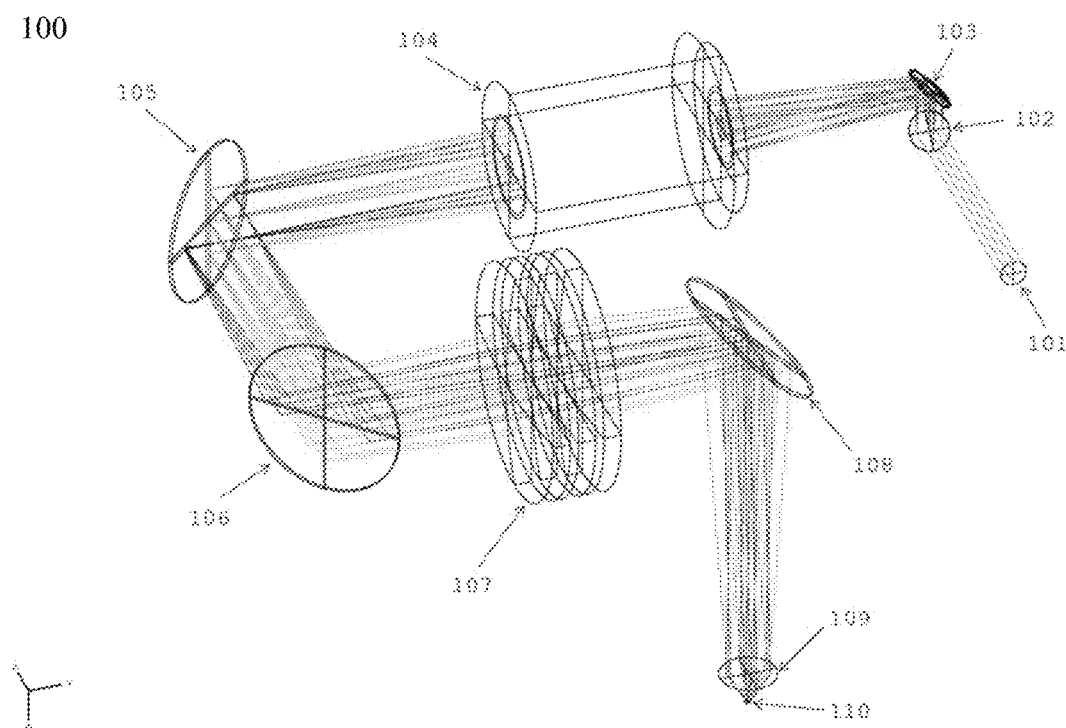
FIGS. 1(a) and 1(b) show the large-angle raster scanning and fluorescence detection optics, respectively according to the invention.
Figure 1B:
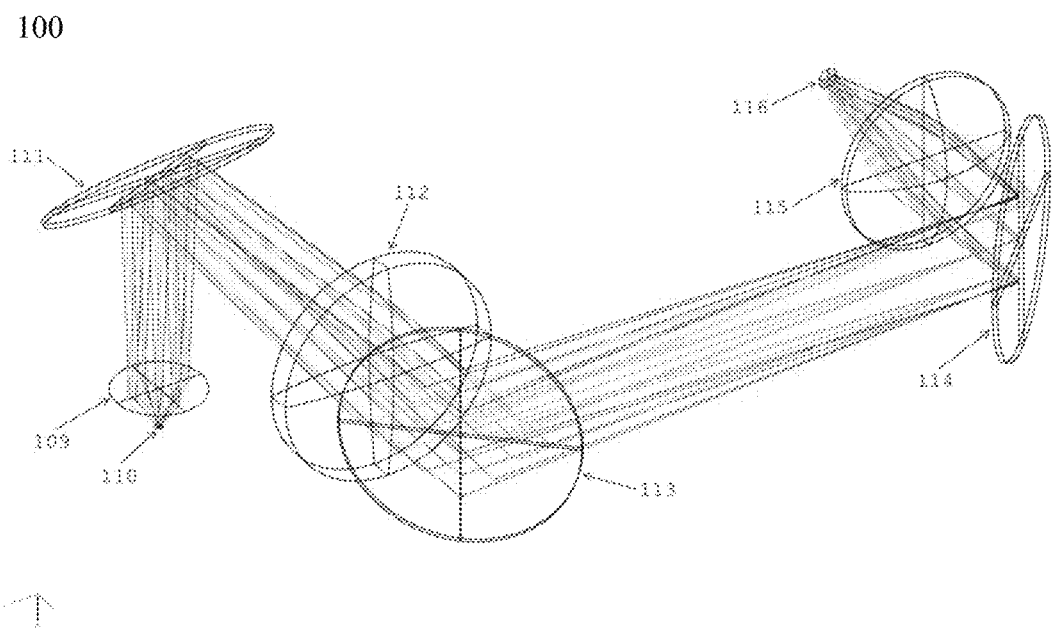

According to the invention, a large-angle optical raster scanning-system (as shown in FIGS. 1(a), 1(b)) is optimized using ZEMAX, with large scanning angle of up to ~±7.16° on the back aperture of the high-NA and low magnification objective lens (Olympus-XLUMPlanF1, 20×, 0.95 W, effective focal length (EFL)=9 mm), producing square-FOV of up to $1.6 \times 1.6$ mm$^2$. To implement large scanning angle, the invention provides and optimizes a dedicated tube lens combining three plano-convex lenses (Admund Optics: 86-925), each with clear aperture and EFL of 73.5 mm and 500 mm, respectively, resulting in combined EFL of 166.7 mm, and producing beam magnification of 1.515 times with combination of a general scan lens (Thorlabs-LSM05-BB, EFL=110 mm); hence, requiring scanning angle of up to ~±10.8° over the scan lens to achieve a square-FOV of $1.6 \times 1.6$ mm$^2$.

Figure 2A:
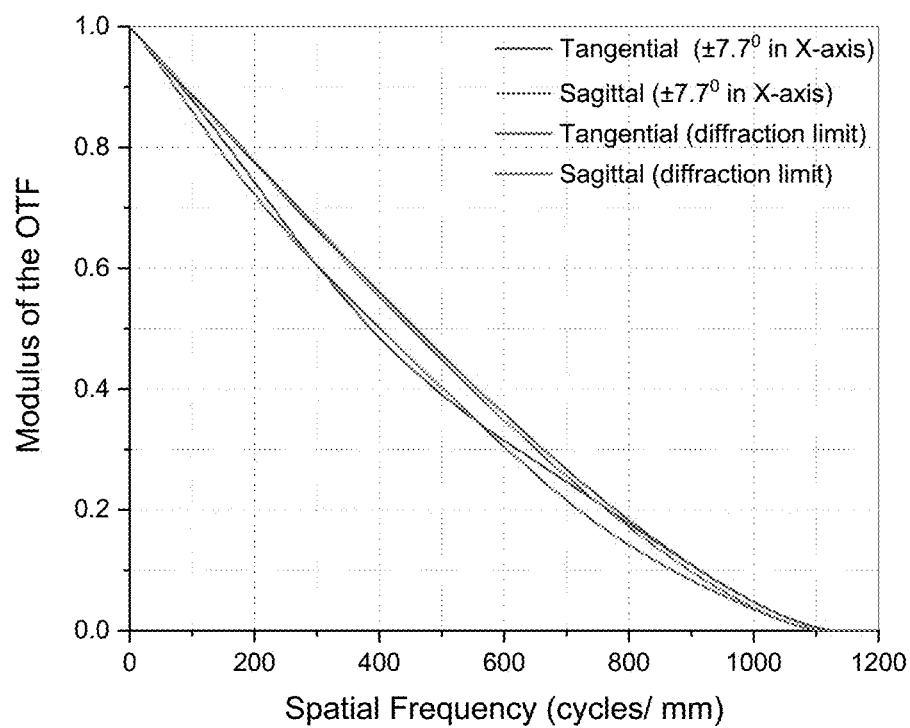
FIGS. 2(a), 2(b) and 2(c) show modulus of the optical transfer function (OTF) vs a spatial frequency (cycles/mm) for angles (over the scan lens) of ±7.7° off-axis in X direction, 0° off-axis in X and Y directions and ±7.7° off-axis in Y direction, respectively.
Figure 2B:
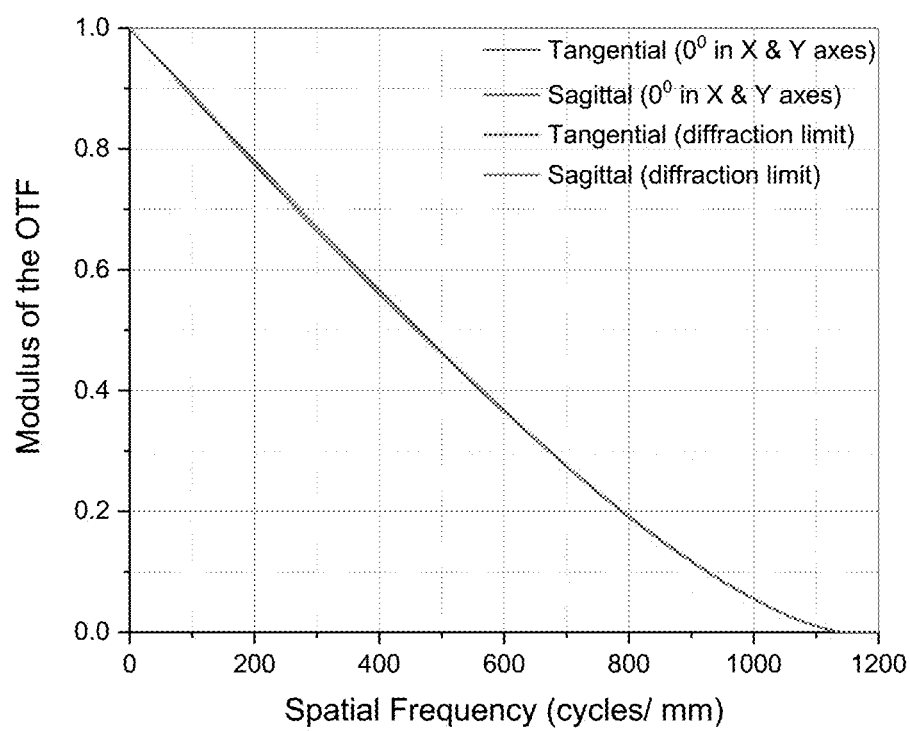
Figure 2C:
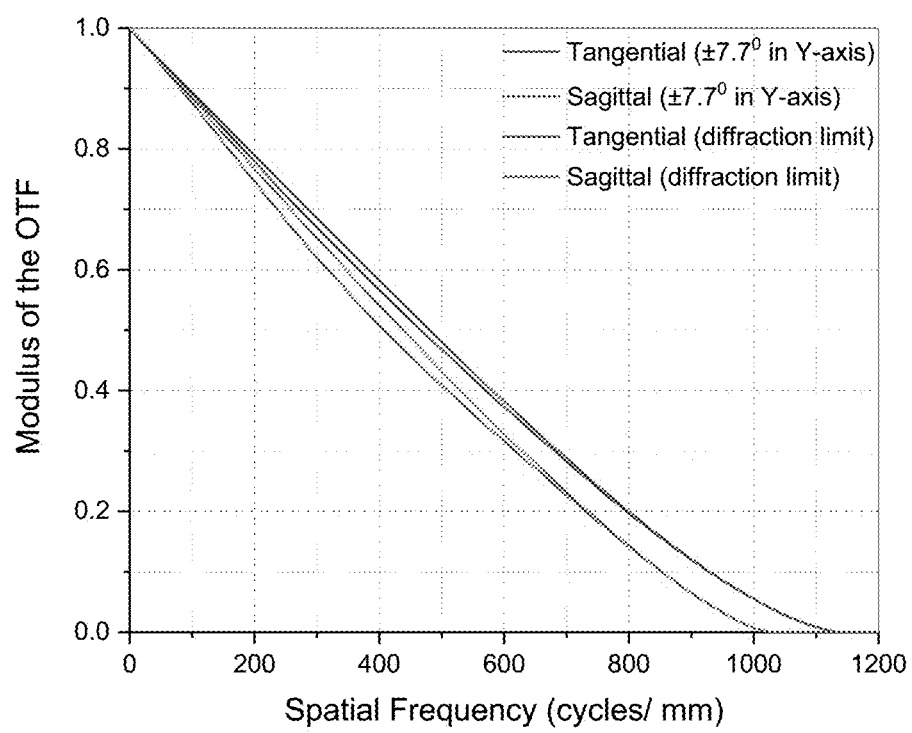

Using an input beam at λ=1070 nm with a diameter of 9.25 mm and considering the high-NA and low magnification objective lens as a paraxial lens, the root mean square (RMS) wavefront errors (without defocus) and Strehl Ratios are found to be <0.07λ and >80%, respectively, for 0° and ±7.7° off-axis configurations (over the scan lens) in X and Y directions, confirming diffraction-limited performance at the edge-centers of the FOV of $1.6 \times 1.6$ mm$^2$, indicating >78% of the FOV (i.e., $\pi \times 0.8^2$ mm$^2$=2.01 mm$^2$ circular-FOV out of $1.6 \times 1.6$ mm$^2$=2.56 mm$^2$ square-FOV) being diffraction-limited (Maréchal Criterion). FIGS. 2(a), 2(b) and 2(c) plot modulus of the optical transfer function (OTF) vs spatial frequency (cycles/mm) for angles (over the scan lens) of ±7.7° off-axis in the X direction, 0° off-axis in X and Y directions and ±7.7° off-axis in the Y direction, respectively. Besides, RMS wavefront errors (without defocus) at a fixed image plane simultaneously for all configurations of 0° and ±7.7° off-axis over the scan lens in both X and Y directions are under 0.1λ, indicating a low field curvature of the system. For efficient collection of fluorescence signal, a relay system with demagnification factor of 3.75 is employed (FIG. 1(b)), resulting in ~4 mm focused spot diameter throughout the scanning range, small enough to be inside a PMT photosensitive area.

Acquiring a minimum pixel number demanded by Nyquist Criterion is crucial for retrieving the best optical resolution. FOV of $1.6 \times 1.6$ mm$^2$ requires a pixel number of 7459×7459 for resolving the theoretical two-photon lateral resolution of ~429 nm (λ=1070 nm, NA=0.95), with a pixel size of 214.5 nm. The invention introduces a Nyquist-exceeding data acquisition system capable of simultaneously sampling 4 channels at up to 125 M samples per second (MSps) sampling-rate, reaching a single-frame pixel number of 15720×16000 for 4 channels, leading to ~1 Gigapixels per frame, while maintaining ~0.5 fps (frames per second). In the invention, an acquisition speed of 70 M samples per second is implemented with synchronized sampling of 1 voxel per optical pulse from a femtosecond laser source (Coherent Fidelity-2 Fiber Laser) with a 70 MHz repetition rate, with the ability of scanning a $1.6 \times 1.6 \times 1.6$ mm$^3$ volume, with 8800×8800×2000 (×4 channels), i.e., 619.52 Giga-voxels, capturing ~1.13 Terabyte of 16-bit raw data with 14-bit resolution in <39 minutes at 0.8 μm Z-steps, and maintaining a Nyquist-exceeded voxel-size, a Nyquist-exceeded volume-scanning speed and a Nyquist-exceeded line-scanning speed of <27 attoliter, >1750 μm$^3$/ms and >12 mm/ms, while maintaining an effective pixel dwell time of <40 ns, at up to an effective lateral resolution of <500 nm.

In the invention, an acquisition speed of 95 M samples per second is further implemented with synchronized sampling of 1 voxel per optical pulse from a femtosecond laser source (Chromium-Forsterite Laser) with a 95 MHz repetition rate, with the ability of scanning a 1.6×1.6×1.6 mm³ volume, with 12000×12000×2000 (×4 channels), i.e., 1.152 Tera-voxels, capturing ~2.1 Terabyte of 16-bit raw data with 14-bit resolution in <53 minutes at 0.8 µm Z-steps, and maintaining a Nyquist-exceeded voxel-size, a Nyquist-exceeded volume-scanning speed and a Nyquist-exceeded line-scanning speed of <15 attoliter, >1288 µm³/ms and >12 mm/ms, while maintaining an effective pixel dwell time of <35 ns, at up to an effective lateral resolution of <420 nm.

The invention further utilizes a multithreaded control algorithm for synchronization of slow Y-axis with fast X-axis, without sending external electrical frame-trigger signals after completion of each frame, thereby achieving a frame rate of ~983 fps with single-frame pixel number of 15720×8 (×4 channels), i.e., 125,760 (×4 channels) voxels at 125 M samples per second sampling-rate, including real-time storage of acquired data in 16-bit format with 14-bit resolution, reaching resonant scanner limited frame rate, confirming robustness of slow Y-axis synchronization. Table 1 and Table 2 depict acquisition capability of the invented data acquisition system and its performance caparison with a state-of-the-art system, respectively, concluding that the system of the invention provides >4 times larger FOV with ~6 times higher frame rate while maintaining >4.5 times higher pixel number in comparison to a state-of-the-art system (Leica SP8 Confocal).

Table 3 depicts software dependency and pre-requisite hardware for a C++ based GPU-accelerated control and acquisition software according to the invention, in which the software dependency and the hardware requirements are listed.

Figure 3A:
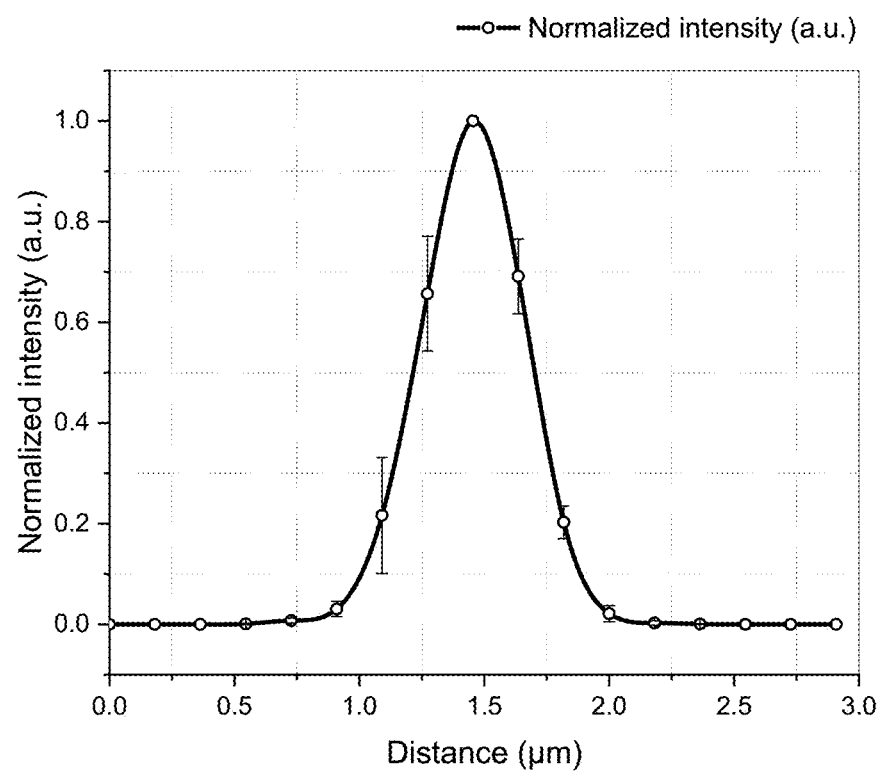
FIGS. 3(a) and 3(b) show lateral and axial cross sections, respectively with averaging of 25 beads (with diameter of 220 nm), with error bars indicating the standard deviations. Gaussian-fitting results in effective two-photon lateral and axial resolutions (i.e., full width half maximum (FWHM)) of 0.483 μm and 1.997 μm, respectively, i.e., effective 3D resolution of <0.5 femtoliter with standard deviation and standard error of the mean of 0.0342 μm and 0.0068 μm, respectively for lateral resolution and 0.3027 μm and 0.0605 μm, respectively for axial resolution.

The resolution analysis of the invented system utilizes Fluoresbrite® Multifluorescent Microspheres (Polysciences, Inc.), with diameter of 220 nm. Beads are immobilized by immersing them in 0.7% agarose solution and are scanned for FOV of 1.6×1.6 mm², with a single-frame pixel number of 8800×8800, maintaining a pixel and voxel size of ~181.82 nm and ~9.92 attoliter (with Z-steps of 300 nm), respectively. FIGS. 3(a) and (b) depict lateral and axial cross sections, respectively, averaging 25 beads, error bars indicating the standard deviations. Applying gaussian fitting, effective two-photon lateral and axial resolutions (i.e., full width half maximum (FWHM)) are found to be 0.483 µm and 1.997 µm, respectively, resulting in effective 3D resolution of <0.5 femtoliter. The standard deviation and standard error of the mean for lateral resolution are 0.0342 µm and 0.0068 µm, respectively and for axial resolution are 0.3027 µm and 0.0605 µm, respectively.

Figure 3B:
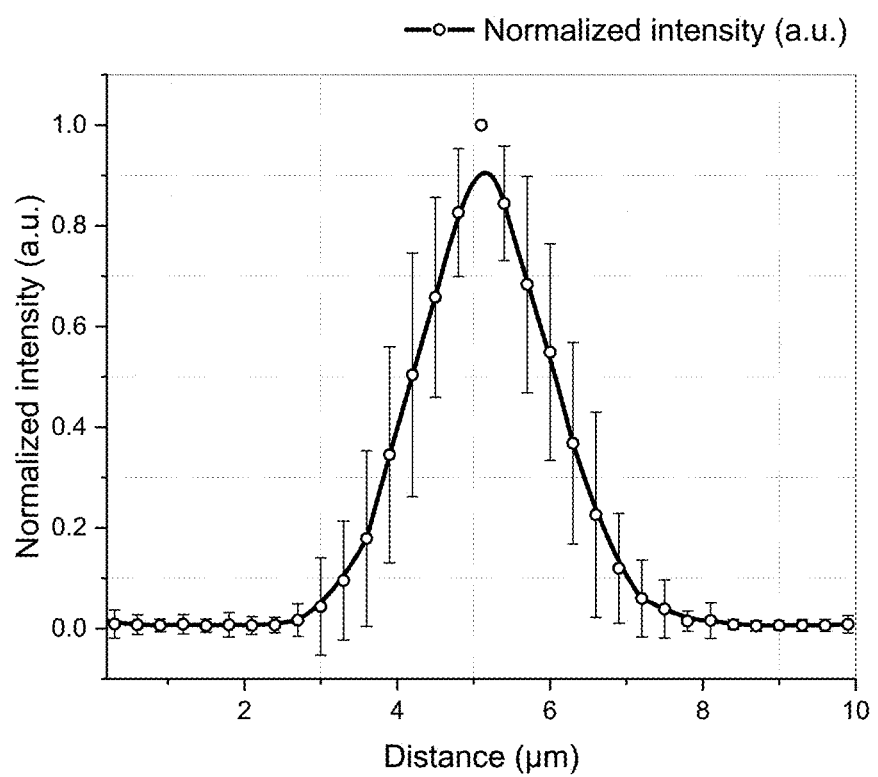
Figure 4A:
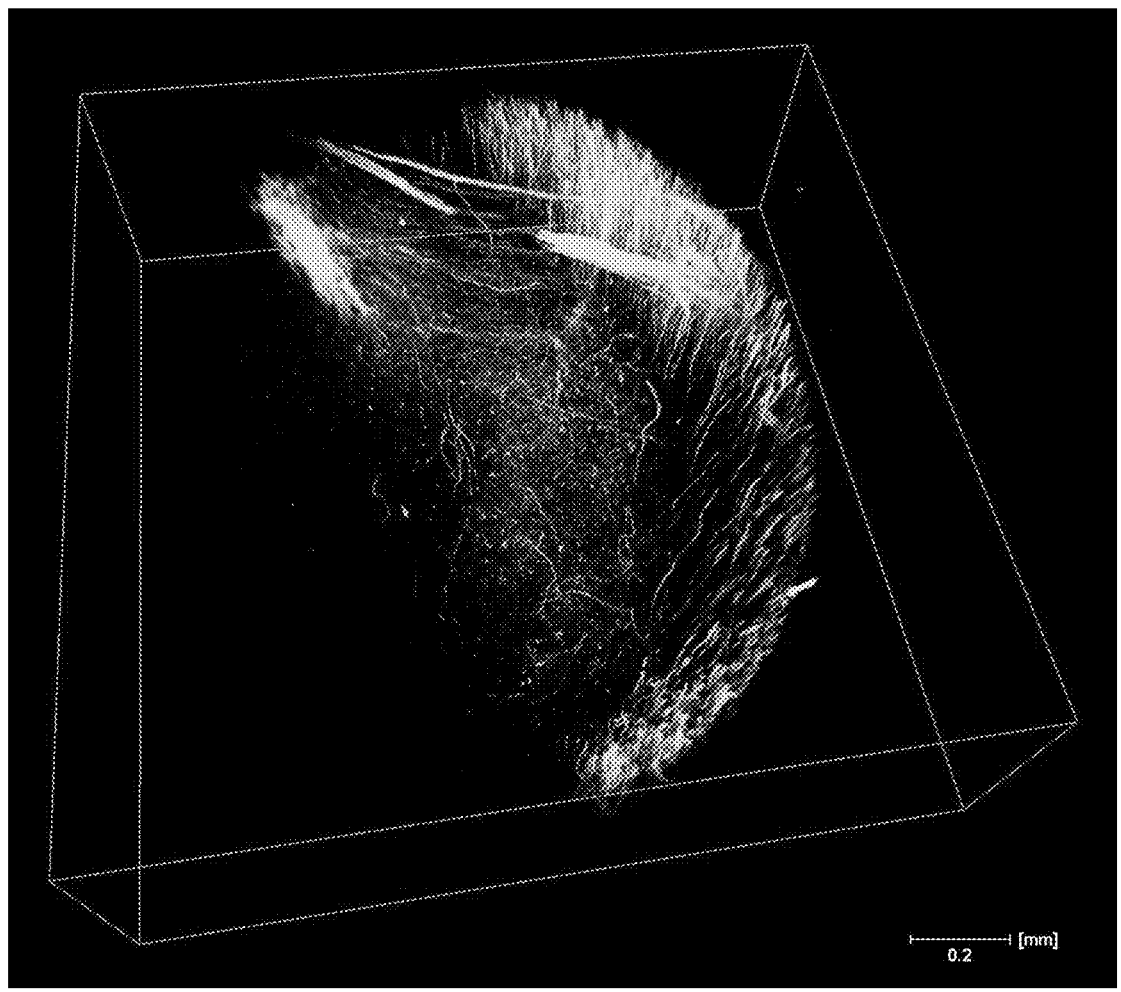
FIGS. 4(a) and 4(b) depict a 3D rendered volume of a volumetric tissue-sample of tdTomato positive ex vivo mouse medulla, in inclined and top views, respectively, being scanned under the invented large-angle optical raster scanning system.
Figure 4B:
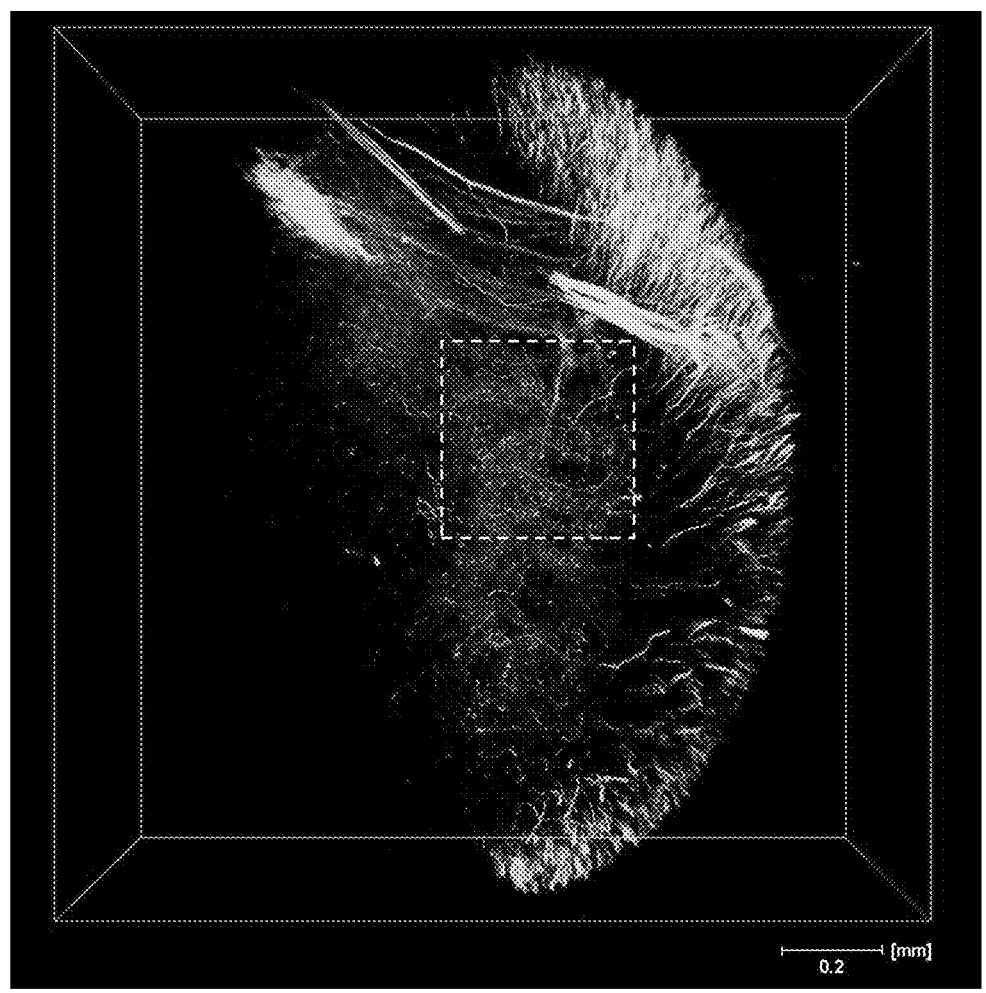
Figure 4C:
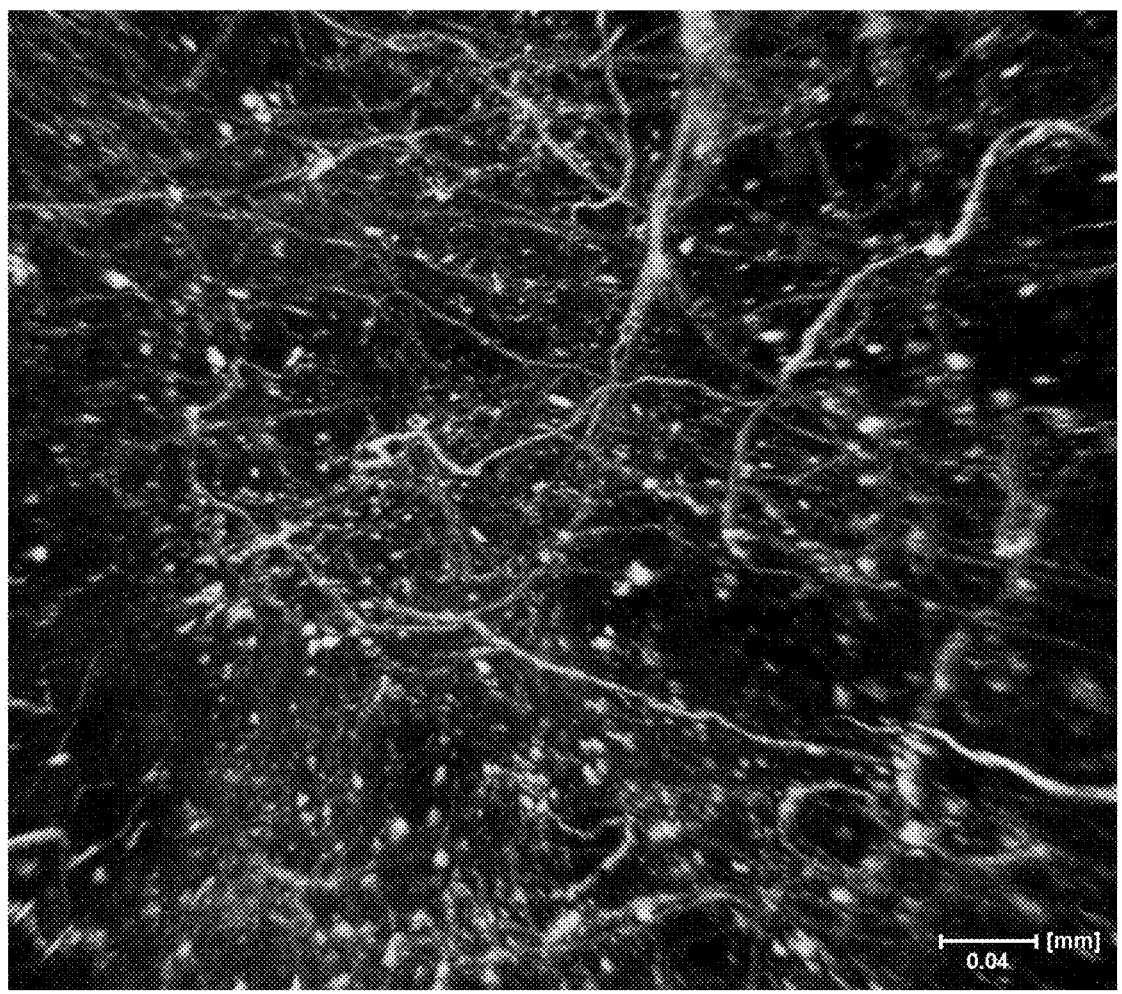
FIG. 4(c) depicts a 3D zoomed region cropped from the original volume shown in FIG. 4(b).
Figure 4D:
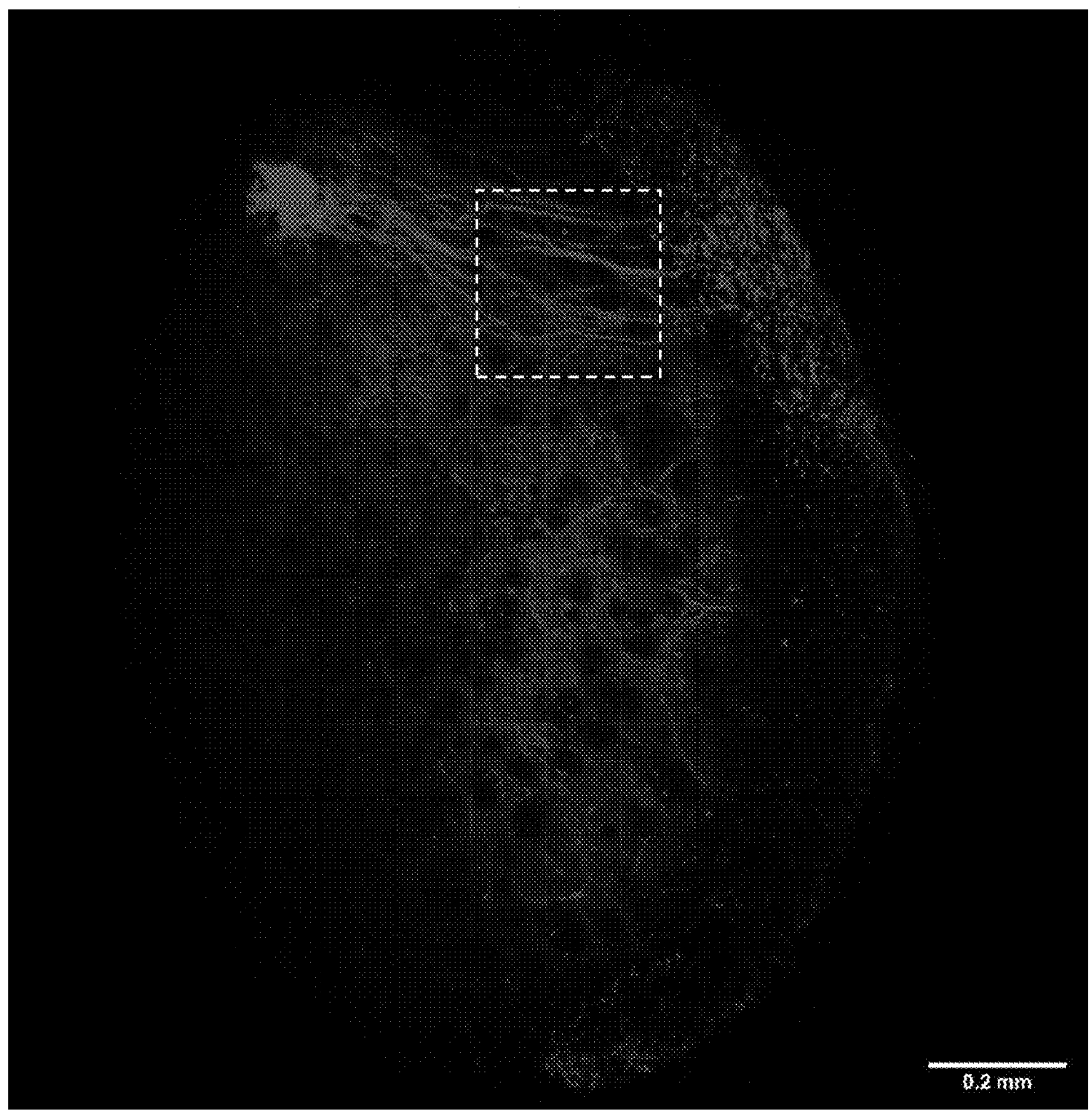
FIG. 4(d) depicts an image formed by overlapping of 10 frames within a depth range of ~170 μm to ~173 μm, extracted from the same volume being described in FIGS. 4(a) and (b).
Figure 4E:
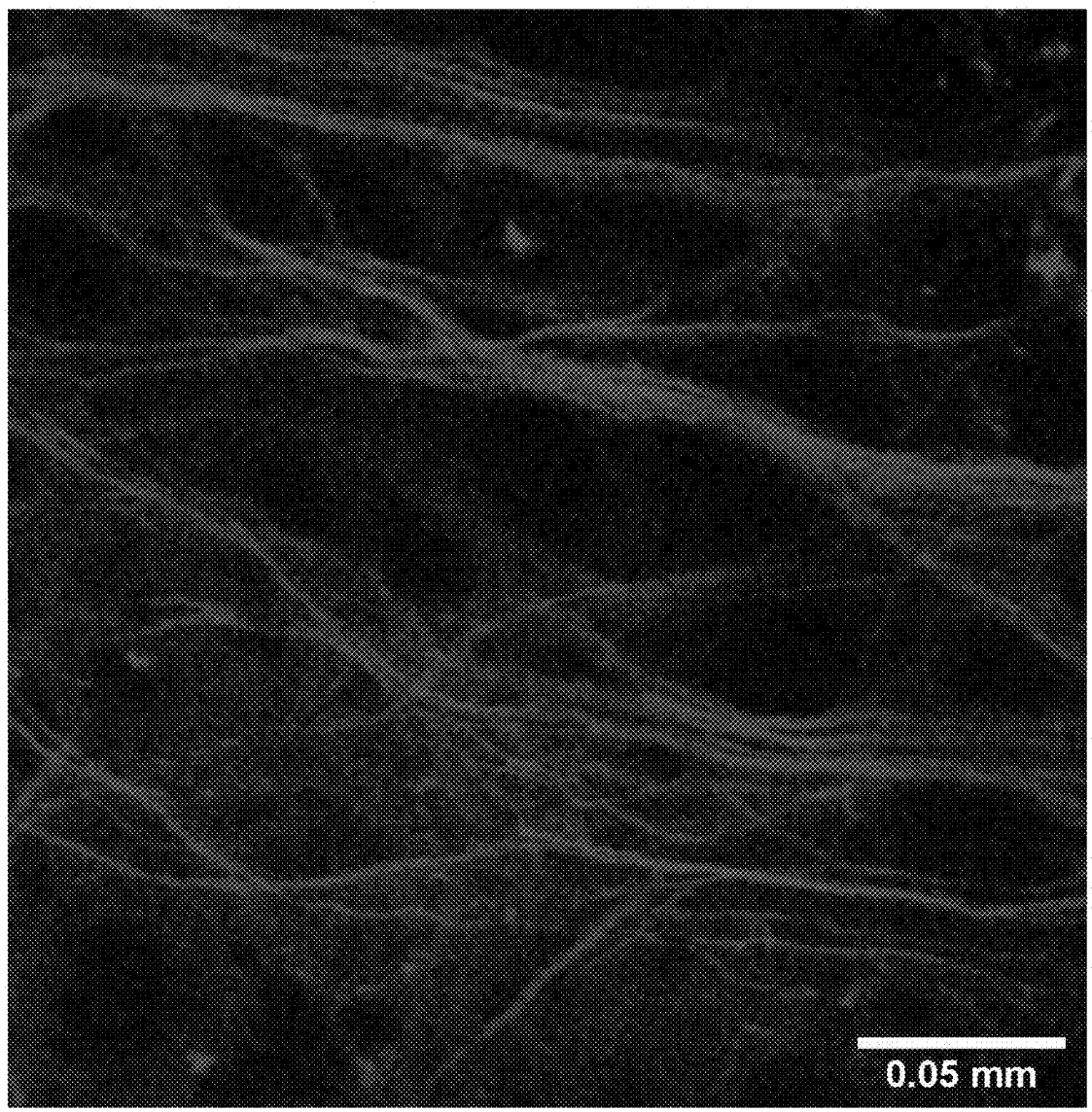
FIG. 4(e) depicts a zoomed region cropped from the original image shown in FIG. 4(d).

Referring to the invention, FIGS. 1(a) and 1(b) show the large-angle raster scanning system with its fluorescence detection optics, respectively with 101: input laser beam, 102, 103: resonant and galvanometer scanning mirror, respectively, 104, 107: scan lens and dedicated tube lens, respectively, 109: high-NA and low magnification objective lens, 110: focal plane, 111: dichroic beam splitter, 112, 115: focusing lenses, 116: PMT photosensitive area, 105, 106, 108, 113, 114: turning mirrors. FIGS. 2(a), 2(b) and 2(c) show modulus of the optical transfer function (OTF) vs spatial frequency (cycles/mm) for angles (over the scan lens) of ±7.7° off-axis in the X direction, 0° off-axis in the X and Y directions and ±7.7° off-axis in the Y direction, respectively. FIGS. 3(a) and 3(b) show lateral and axial cross sections, respectively, averaging 25 beads (with diameter of 220 nm) and error bars indicating the standard deviations. Gaussian-fitting results in effective two-photon lateral and axial resolutions (i.e., full width half maximum (FWHM)) of 0.483 µm and 1.997 µm, respectively, i.e., effective 3D resolution of <0.5 femtoliter with standard deviation and standard error of the mean of 0.0342 µm and 0.0068 µm, respectively for lateral resolution and 0.3027 µm and 0.0605 µm, respectively for axial resolution. FIGS. 4(a) and 4(b) depict a 3D rendered volume in inclined and top views, respectively, with a volume size of 1.6×1.6×0.5 mm³, being scanned under the invented large-angle optical raster scanning system, with 8800×8800×1711 voxels, i.e., a total number of 132.5 Giga-voxels maintaining Z-step size of 300 nm, with tdTomato positive ex vivo mouse medulla being used as a volumetric tissue-sample for two-photon imaging, being excited with a femtosecond laser source (Coherent Fidelity-2 Fiber Laser) with a 70 MHz repetition rate at a 1070 nm central wavelength, 3D rendered using Amira 5.3.2 (Visage Imaging Inc., San Diego, Calif.) software, with no stitching and/or mosaicking being applied. FIG. 4(c) depicts a 3D zoomed region cropped from the original volume shown in FIG. 4(b), i.e., the region being marked by the white dotted box in FIG. 4(b). FIG. 4(d) depicts an image formed by overlapping of 10 frames within a depth range of ~170 µm to ~173 µm, extracted from the same volume being described in FIGS. 4(a) and 4(b), with a two-dimensional (2D) FOV of 1.6×1.6 mm², with a Nyquist-exceeded pixel size of ~181.82 nm. FIG. 4(e) depicts a zoomed region cropped from the original image shown in FIG. 4(d), i.e., the region being marked by the white dotted box in FIG. 4(d), resolving micro-optical resolution with a Nyquist-exceeded pixel size of ~181.82 nm.

Opto-Mechanical Setup for Large-Angle Optical Raster Scanning:

Maximization of FOV demands a low magnification ratio by the scan lens and tube lens pair. Concurrently, maximization of excitation-NA of the objective lens demands incident beam to fulfil its back aperture, necessitating largest possible beam diameter to hit the scan lens for the optimum condition. Therefore, a 4 kHz resonant scanner (FIG. 1(a)-102) from Cambridge Technology is chosen for fast X-axis scanning, with large clear aperture of 12 mm×9.25 mm. For slow Y-axis, a galvanometer scanner (FIG. 1(a)-103) from Cambridge Technology is chosen with a clear aperture of 14 mm. A pulsed laser source (Coherent Fidelity-2 Fiber Laser) operating at a repetition rate of 70 MHz centered at 1070 nm or/and a pulsed laser source (Chromium-Forsterite Laser) operating at a repetition rate of 95 MHz centered at 1260 nm is/are used as source(s) (FIG. 1(a)-101) for nonlinear excitation of the volumetric tissue-sample. A beam expander with 1:5 magnification is used to expand the beam sufficiently, overfilling the resonant scanning mirror. Employing ThorLabs-LSM05-BB as scan lens (FIG. 1(a)-104) with EFL of 110 mm and a dedicated tube lens, or a custom designed tube lens, i.e., a combination of three plano-convex lenses (FIG. 1(a)-107) (Admund Optics: 86-925, EFL=500 mm) with combined EFL of 166.7 mm, a beam magnification by a factor of 1.515 is achieved resulting in a beam size of >14 mm (up to 18 mm) over the back aperture of the high-NA and low magnification objective lens (FIG. 1(a)-109) (Olympus XLUMPlanF1, 20×, 0.95 W, EFL=9 mm, pupil-diameter ~17 mm).

Signal-Collecting Opto-Electronic System:

FIG. 1(b) illustrates the inclined view of the signal collecting optical design, a part of the large-angle optical raster scanning system. The generated fluorescence signal emerging from the volumetric tissue-sample at the focal plane (FIG. 1(b)-110) is collected by the high-NA and low magnification objective lens (FIG. 1(b)-109) and is reflected towards the detection unit by a dichroic beam-splitter (FF801-Di02, Semrock) (FIG. 1(b)-111). The detection unit comprises a relay system with two lenses having EFL of 150 mm (Admund Optics: 32-982, bi-convex) (FIG. 1(b)-112) and 40 mm (Admund Optics: 48-654, plano-convex) (FIG. 1(b)-115) with clear apertures of 49 mm and 39 mm, respectively; downsizing the emerging fluorescence beam being collected by the high-NA and low magnification objective lens by a factor of 3.75, and thereby providing ~4 mm focused spot diameter throughout the scanning range, which is small enough to be inside the photosensitive area of the PMT (FIG. 1(b)-116) (R10699, Hamamatsu, photosensitive area=24×8 mm$^2$). A band pass filter (FF01-580/60-25-D, Semrock) is placed before the PMT photocathode in order to ensure detection of tdTomato two-photon fluorescence signal. For current to voltage conversion, signal from the PMT is passed through a transimpedance amplifier (C6438-01, Hamamatsu), whose output is digitized using AlazarTech ATS9440 digitizer with 14-bit resolution.

Performance Analysis Using ZEMAX:

As illustrated in FIG. 1(a), a resonant scanning and galvanometer scanning mirrors (tagged as FIG. 1(a)-102 and FIG. 1(a)-103, respectively) are separated by distance of 12 mm, resulting in non-identical performance in the X and Y directions, due to the fact that, both the mirrors cannot be equidistant from the scan lens (FIG. 1(a)-104). For an optimized design, a complete 3D simulation of the raster scanning system is performed using ZEMAX, simultaneously configuring different scanning angles of the resonant and galvanometer scanning mirrors for X and Y directions, respectively (i.e., 0° and ±7.7° off-axis configurations (over the scan lens) in X and Y directions with respect to the optical-axis). The system is optimized at 1070 nm considering the high-NA and low magnification objective lens (FIG. 1(a)-109, Olympus-XLUMPlanF1, 20×, 0.95 W) as a paraxial lens with EFL of 9 mm. Performance of the optical system further depends on the size of input laser beam, with the fact that, for larger input beam diameter required for filling the back aperture of the objective lens for maximizing excitation-NA, the optical aberrations caused by the scan lens (FIG. 1(a)-104) and dedicated tube lens (FIG. 1(a)-107) become significant particularly for larger scanning angle and the overall performance gets degraded. Therefore, in order to assess the real performance of the scanning system, an input beam diameter of 9.25 mm (i.e., minimum size of the 4 kHz resonant scanning mirror) is used while performing the simulation.

Figure 1C:
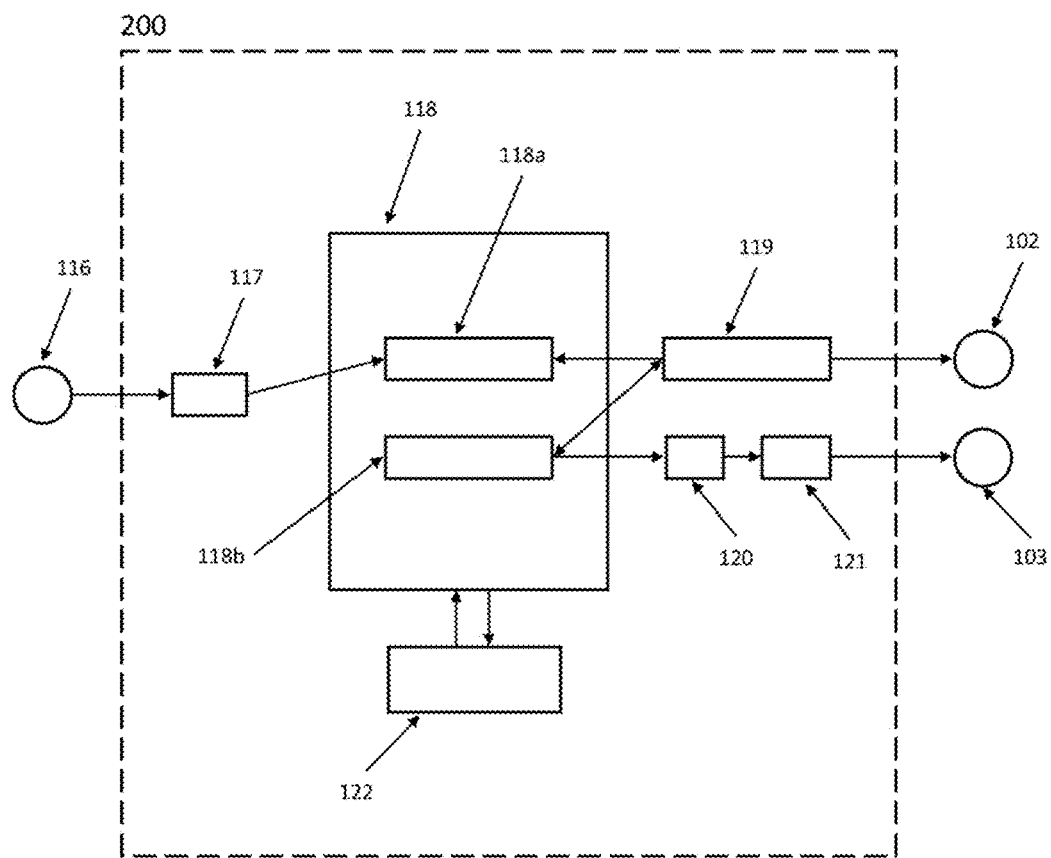
FIG. 1(c) depicts the block diagram of the control and data acquisition system with the control electronics contained therewith.

Data Acquisition System with Full-Field Beyond-Nyquist Resolvability:

The data acquisition system 200, being provided with control-electronics is depicted in FIG. 1(c). In the data acquisition system 200, a transimpedance amplifier (FIG. 1(c)-117) is used for current to voltage conversion of the output signal from the PMT (FIG. 1(c)-116). Output from the amplifier is digitized using a digitizer ATS9440 from AlazarTech (FIG. 1(c)-118a). A controlling card PCIe-6341 from National Instrument (FIG. 1(c)-118b) is used for synchronization of the slow Y-axis with the fast X-axis. A resonant scanning mirror controller (FIG. 1(c)-119) and a galvanometer scanning mirror controller (FIG. 1(c)-121) (electronic driver boards) are used for controlling the resonant scanning mirror (FIG. 1(c)-102) and galvanometer scanning mirror (FIG. 1(c)-103), respectively. Both elements FIG. 1(c)-118a and FIG. 1(c)-118b receive the sync signal (a 4 kHz digital signal, each edge representing a change in motion-direction of the resonant scanning mirror) from the resonant scanning mirror controller (FIG. 1(c)-119). Element FIG. 1(c)-118b has control over the amplitude of resonant scanning mirror (FIG. 1(c)-102), through its controller unit (FIG. 1(c)-119). A 16-bit Digital to Analog Converter (DAC) (FIG. 1(c)-120) is used to convert 16-bit digital data words generated by FIG. 1(c)-118b (calculated and commanded by the control and acquisition software FIG. 1(c)-122) into voltage and to provide that specific voltage on to the galvanometer scanning mirror controller (FIG. 1(c)-121), producing specific orientation/angle of the slow Y-axis mirror (FIG. 1(c)-103). Element FIG. 1(c)-122 is a custom developed C++ based GPU-accelerated control and acquisition software which has control over the elements: FIG. 1(c)-118a, 118b, 119, 120, 121, 102 and 103.

The developed control and acquisition software (FIG. 1(c)-122) is a multi-threaded application written in C++ and C # (using Visual Studio 2017) integrating C/C++ support from AlazarApi and NIDAQmx providing control over ATS9440 (from AlazarTech) (FIG. 1(c)-118a) and PCIe-6341 (from National Instruments) (FIG. 1(c)-118b), respectively. The digitizer ATS9440 (FIG. 1(c)-118a) enables simultaneous sampling of 4 channels at up to a sampling rate of 125 M samples per second with 14-bit resolution, further providing dual-port memory support, enabling simultaneous data transfer to the host memory during ongoing data acquisition. For high-speed processing of acquired data, NVIDIA CUDA (Compute Unified Device Architecture) (version: 10.1) accelerated OpenCV (library for image processing) (version: 4.1.1) is utilized by the custom developed control and acquisition software. A computer with Intel® Core™ i7-9800X processor and Nvidia Quadro RTX 8000 graphics card is used to run the control and acquisition software.

The custom developed control and acquisition software further implicates a multithreaded control algorithm for synchronization of the slow Y-axis with the fast X-axis, without sending external electrical frame-trigger signals after completion of each frame. A 16-bit DAC module (Model 6757 from Cambridge Technology) (FIG. 1(c)-120) is interfaced with MicroMax™ Series 671 (driver module for galvanometer scanning mirror from Cambridge Technology) (FIG. 1(c)-121) for precise movement of the slow Y-axis. For sending the 16-bit data word to the 6757 DAC module (FIG. 1(c)-120), a controlling card PCIe-6341 (National Instruments, FIG. 1(c)-118b) (with 24 digital I/O pins) is directly interfaced to the computer motherboard, thereby enabling direct control over the slow Y-axis motion from the control and acquisition software. A background thread continuously monitors the line trigger signal (sync signal) from the resonant scanner and produces the 16-bit data words, i.e., the angle-positioning-steps to the DAC module making use of 16-bit resolution. A frame rate of ~983 fps is achieved with single-frame pixel number of 15720×8 (×4 channels), i.e., 125,760 (×4 channels) voxels at a sampling rate of 125 M samples per second, including real-time storage of the acquired data in 16-bit format with 14-bit resolution, reaching the maximum frame rate limited by the resonant scanner frequency, confirming the robustness of slow Y-axis synchronization.

Referring to FIGS. 1(a), 1(b) and 1(c), the essence of the preferred embodiment of the invention is summarized as follows. The invention provides a large-angle optical raster scanning system 100 for high-speed deep tissue imaging, being provided with field of view (FOV) of at least one square millimeter with sub-femtoliter effective 3D resolution resolved by Nyquist-exceeded synchronized sampling, comprising:

one or more, i.e., 1st to $n^{th}$, pulsed laser source(s) 101 for emitting one or more laser beams with central wavelengths of $\lambda_n$ and a Nyquist-exceeding repetition rate of $R_n \geq A_n \times N_n$ for the $n^{th}$ pulsed laser source, where $A_n$ is a Nyquist-limited sampling rate given by 4 times the horizontal FOV multiplied by a resonant scanner frequency divided by theoretical objective-limited lateral resolution, for resolving micro-optical resolution across a horizontal FOV of >1 mm, and $N_n$ is an integer $\geq 1$ signifying a number of laser pulse(s) per voxel;

a resonant scanning mirror 102 optically coupled to the one or more pulsed laser source(s);

a galvanometer scanning mirror 103 optically coupled to the resonant scanning mirror;

a scan lens 104 optically coupled to the galvanometer scanning mirror 103;

a dedicated tube lens 107, comprising three plano-convex lenses, each with an effective focal length of 500 mm, combined together and optically coupled to the scan lens 104;

a high-NA (numerical aperture) and low magnification objective lens 109 optically coupled to the dedicated tube lens 107 for raster scanning a volumetric tissue-sample placed at a focal plane 110 and for collecting a sample-generated fluorescence signal which is guided to a photomultiplier tube (PMT) 116 to produce an electrical signal; and a data acquisition system 200 coupled to receive the electrical signal from the PMT 116 with each sampling event synchronized to each optical pulse either from the one pulsed laser source, or from the highest repetition rate pulsed laser source, in case of one, or more pulsed laser source(s), respectively, consisting of a transimpedance amplifier 117, an AlazarTech digitizer 118a, a National Instrument card 118b, a resonant scanning mirror controller 119, a 16-bit Digital to Analog Converter (DAC) 120, a galvanometer scanning mirror controller 121, and a control and acquisition software 122, wherein the scan lens and the dedicated tube lens constitute a beam expander with low magnification, thereby maximizing the field of view (FOV), but concurrently providing an enlarged beam size over a back aperture of the high-NA and low magnification objective lens to maintain high excitation-NA, and thereby high-resolution.

According to the large-angle optical raster scanning system 100 of the invention, the data acquisition system 200 enables synchronized sampling with a sampling rate equal to the repetition rate $R_n \geq A_n \times N_n$ of the $n^{th}$ pulsed laser, i.e., the one pulsed laser source, or the highest repetition rate pulsed laser source, in case of one, or more pulsed laser source(s), respectively, with each sampling event synchronized to each optical pulse, thereby achieving a Nyquist-exceeded (exceeding Nyquist Criterion) pixel number to resolve micro-optical resolution across horizontal FOV of >1 mm without shrinking down the FOV size.

In the large-angle optical raster scanning system of the invention, the high-NA and low magnification objective lens 109 is >0.9 in the numerical aperture and ≤20× in an effective magnification.

As provided, the frequency of the resonant scanning mirror 102 is at least 4 kHz, and the resonant scanning mirror 102 provides a clear aperture of 12 mm×9.25 mm, which is overfilled with the input one or more laser beams to maximize a scanning beam size.

In the invention, a first pulsed laser source operates at a repetition rate of 70 MHz centered at 1070 nm and a second pulsed laser source operates at a repetition rate of 95 MHz centered at 1260 nm.

According to the invention, the dedicated tube lens 107 comprises the three plano-convex lenses combined together, each having an effective focal length of 500 mm, resulting in a combined effective focal length of 166.7 mm, and providing a large clear aperture of >60 mm in diameter for supporting large scanning angle by the resonant scanning mirror and the galvanometer scanning mirror.

In one embodiment of the large-angle optical raster scanning system 100 of the invention, the scan lens 104 and the dedicated tube lens 107 with effective focal lengths of 110 mm and 166.7 mm, respectively, constitute a low magnification relay system with magnification of 1.515, thereby providing a scanning angle of up to ~±7.16° on the back aperture of the high-NA and low magnification objective lens with a scanning angle of up to ~±10.8° over the scan lens, and hence the square and circular field of view (FOV) of up to 1.6×1.6 mm² and 2.26 mm in diameter, respectively, but concurrently providing an enlarged beam size of >14 mm (up to 18 mm) over the back aperture of the high-NA and low magnification objective lens (NA>0.9), thereby providing high-resolution.

In a further embodiment of the large-angle optical raster scanning system 100 of the invention, an input beam at $\lambda=1070$ nm with a diameter of 9.25 mm and the high-NA and low magnification objective lens simulated as a paraxial lens, produce root mean square (RMS) wavefront errors (without defocus) and Strehl Ratios to be <0.07$\lambda$ and >80%, respectively, for 0° and ±7.7° off-axis configurations (over the scan lens) in X and Y directions, confirming a diffraction-limited performance at edge-centers of the FOV of 1.6×1.6 mm², indicating >78% of the FOV, i.e., $\pi \times 0.8^2$ mm²=2.01 mm² circular-FOV out of 1.6×1.6 mm²=2.56 mm² square-FOV, to be diffraction-limited (Marechal Criterion).

In another embodiment of the invention, an input beam at $\lambda=1070$ nm with a diameter of 9.25 mm and the high-NA and low magnification objective lens simulated as a paraxial lens, produce RMS wavefront errors (without defocus) at a fixed image plane simultaneously for all configurations of 0° and ±7.7° off-axis over the scan lens in both X and Y directions to be under 0.1$\lambda$, concluding a low field curvature of the system.

Further, efficient collection of the fluorescence signal is achieved by a relay system with a demagnification factor of 3.75, resulting in a ~4 mm focused spot diameter to be inside a photosensitive area of the PMT.

According to the invention, a first turning mirror 105 and a second turning mirror 106 are optically coupled to the scan lens 104, the dedicated tube lens 107 is optically coupled to the second turning mirror 106, a third turning mirror 108 is optically coupled to the dedicated tube lens 107, and the high-NA and low magnification objective lens 109 is optically coupled to the third turning mirror to achieve a portable form factor.

In addition, it is provided sequentially a dichroic beam splitter 111, a bi-convex lens 112, a fourth turning mirror 113, a fifth turning mirror 114, and a plano-convex lens 115 between the back aperture of the high-NA and low magnification objective lens 109 and the photomultiplier tube (PMT) 116.

In the invention, to exceed the requirement for the Nyquist Criterion for complete FOV with a sub-micron lateral optical resolution, the data acquisition system provides capability of simultaneously sampling 4 channels at up to a 125 M samples per second sampling rate, with ability of data acquisition, transfer, processing, previewing and storing of 16-bit raw data with 14-bit resolution for 4 channels simultaneously, and reaching a single-frame pixel number of 15720×16000 (×4 channels), and leading to ~1 Gigapixels per frame acquisition, while maintaining ~0.5 fps.

Alternatively, an acquisition speed of the data acquisition system is maximized at 70 M samples per second by means of the one pulsed laser source pulsing at 70 MHz repetition rate, with synchronized sampling of 1 voxel per optical pulse, with the ability of scanning a 1.6×1.6×1.6 mm$^3$ volume, with 8800×8800×2000 (×4 channels), i.e., 619.52 Giga-voxels, capturing ~1.13 Terabyte of 16-bit raw data with 14-bit resolution in <39 minutes at 0.8 μm Z-steps, and maintaining a Nyquist-exceeded voxel-size, a Nyquist-exceeded volume-scanning speed and a Nyquist-exceeded line-scanning speed of <27 attoliter, >1750 μm$^3$/ms and >12 mm/ms, while maintaining an effective pixel dwell time of <40 ns, at up to an effective lateral resolution of <500 nm.

In still further an embodiment of the invention, an acquisition speed of the data acquisition system is maximized at 95 M samples per second by means of the one pulsed laser source pulsing at 95 MHz repetition rate, with synchronized sampling of 1 voxel per optical pulse, with the ability of scanning a 1.6×1.6×1.6 mm$^3$ volume, with 12000×12000× 2000 (×4 channels), i.e., 1.152 Tera-voxels, capturing ~2.1 Terabyte of 16-bit raw data with 14-bit resolution in <53 minutes at 0.8 μm Z-steps, and maintaining a Nyquist-exceeded voxel-size, a Nyquist-exceeded volume-scanning speed and a Nyquist-exceeded line-scanning speed of <15 attoliter, >1288 μm$^3$/ms and >12 mm/ms, while maintaining an effective pixel dwell time of <35 ns, at up to an effective lateral resolution of <420 nm.

Still further, the data acquisition system 200 comprises a multithreaded control algorithm for synchronization of slow Y-axis scanning by the galvanometer scanning mirror (maintaining 16-bit precision movement) with fast X-axis scanning by the resonant scanning mirror, without sending external electrical frame-trigger signals after completion of each frame, thereby reaching a resonant scanner limited frame rate of ~983 fps with 15720×8 (×4 channels) voxels per frame. In addition, the data acquisition system 200 enables GPU-accelerated real-time calibrations to correct distortions along the fast X-axis caused by a nonlinear speed profile of the resonant scanning mirror.

According to the large-angle optical raster scanning system 100 of the invention, effective two-photon lateral and axial resolutions resolved by the full-field (without shrinking down the FOV) Nyquist-exceeded sampling are <0.5 μm and <2 μm, respectively, resulting in an effective 3D resolution of <0.5 femtoliter, with a standard deviation and a standard error of the mean for the lateral resolution to be <0.04 μm and <0.007 μm, respectively and for the axial resolution to be <0.31 μm and <0.061 μm, respectively.

TABLE 1

Performance of a data acquisition system with full-field beyond-Nyquist resolvability.

Single-frame pixel number (in X and Y axes) with 4 kHz resonant scanner

| Fast X-axis Sampling rate in Million Samples per second (MSps) | | | | | | Slow Y-axis | Largest pixel number (×4 channels) | Maximum data size per frame (in Megabytes) | Frame rate (in frames per second) |
|---|---|---|---|---|---|---|---|---|---|
| 10 MSps | 20 MSps | 50 MSps | 70 MSps | 100 MSps | 125 MSps | | | | |
| 1112 | 2400 | 6224 | 8800 | 12520 | 15720 | 16000 | 15720 × 16000 × 4 | 1918.9 | 0.49 |
| 1112 | 2400 | 6224 | 8800 | 12520 | 15720 | 12000 | 15720 × 12000 × 4 | 1439.2 | 0.64 |
| 1112 | 2400 | 6224 | 8800 | 12520 | 15720 | 8000 | 15720 × 8000 × 4 | 959.47 | 0.96 |
| 1112 | 2400 | 6224 | 8800 | 12520 | 15720 | 4000 | 15720 × 4000 × 4 | 479.74 | 1.88 |
| 1112 | 2400 | 6224 | 8800 | 12520 | 15720 | 1000 | 15720 × 1000 × 4 | 119.93 | 7.87 |
| 1112 | 2400 | 6224 | 8800 | 12520 | 15720 | 500 | 15720 × 500 × 4 | 59.967 | 15.75 |
| 1112 | 2400 | 6224 | 8800 | 12520 | 15720 | 250 | 15720 × 250 × 4 | 29.984 | 31.5 |
| 1112 | 2400 | 6224 | 8800 | 12520 | 15720 | 16 | 15720 × 16 × 4 | 1.919 | 492 |
| 1112 | 2400 | 6224 | 8800 | 12520 | 15720 | 8 | 15720 × 8 × 4 | 0.959 | 983 |

TABLE 2

Comparison of a data acquisition system with a state-of-the-art system (Leica SP8 Confocal).

| Parameters | Leica SP8 Confocal system Performance | Invented system Performance | Comparison with Leica SP8 Confocal system |
|---|---|---|---|
| Field of view (FOV) in square millimeter | FOV = 0.775 × 0.775 mm$^2$ (20X) NA (numerical aperture) = 0.75 | FOV = 1.6 × 1.6 mm$^2$ (20X) NA (numerical aperture) = 0.95 | >4 times larger FOV |
| Frame rate in frames per second | Frame rate ≈ 0.146 fps (4096 × 4096) Pixel size in X and Y axes = 189.26 nm | Frame rate ≈ 0.9 fps (8800 × 8800) Pixel size in X and Y axes = 181.82 nm | ~6 times faster at >4.5 times higher pixel number |

TABLE 2-continued

Comparison of a data acquisition system with a state-of-the-art system (Leica SP8 Confocal).

| Parameters | Leica SP8 Confocal system Performance | Invented system Performance | Comparison with Leica SP8 Confocal system |
|---|---|---|---|
| Maximum pixel number and maximum frame rate in frames per second | Maximum pixel = 8192 × 8192 | Effective pixel dwell time < 40 ns Maximum pixel = 15720 × 16000 (at ~0.5 fps) Maximum frame rate = 15720 × 8 (at ~983 fps) | >3.5 times more capable in terms of dense sampling |

Note:
Throughout the analysis, Leica SP8 Confocal system was maintained at its largest FOV (when using 20X, 0.75NA objective lens), with maximum allowed speed of 600 Hz at minimum allowed zoom factor of 0.75.

TABLE 3

Software dependency and pre-requisite hardware for a C++ based GPU-accelerated control and acquisition software.

| Software dependency | Hardware requirements | |
|---|---|---|
| Operating system: Windows 10 (version: 1809 or newer) Latest Windows driver for NVIDIA CUDA (Compute Unified Device Architecture) enabled graphics card OpenCV 4.1.1 built with CUDA 10.1. 'opencv_world411.dll' must exist either inside 'C:\Windows\System32' or inside installation directory. NI-DAQmx Runtime (version: 18.0 or newer) AlazarTech Windows driver for specific board | Computer | Motherboard chipset: X299 Intel processor: minimum 6 cores/12 threads Single core frequency: >3 GHz Minimum PCIe bus: one x16, one x8, one x4 with full bandwidth (PCIe 3.0 standard) |
| | Graphics | CUDA supported NVIDIA graphics card (recommended: Quadro RTX 4000) |
| | Acquisition card | AlazarTech PCIe digitizer (recommended: ATS9440) |
| | Control card | National Instruments M-series or X-series card with minimum 24 digital I/O (recommended: PCIe 6341) |

What is claimed is:

1. A large-angle optical raster scanning system for high-speed deep tissue imaging, being provided with field of view (FOV) of at least one square millimeter with sub-femtoliter effective 3D resolution resolved by Nyquist-exceeded synchronized sampling, comprising:

one or more, i.e., 1st to $n^{th}$, pulsed laser source(s) for emitting one or more laser beams with central wavelengths of $\lambda_n$ and a Nyquist-exceeding repetition rate of $R_n \geq A_n \times N_n$ for the $n^{th}$ pulsed laser source, where $A_n$ is a Nyquist-limited sampling rate given by 4 times the horizontal FOV multiplied by a resonant scanner frequency divided by theoretical objective-limited lateral resolution, for resolving micro-optical resolution across a horizontal FOV of >1 mm, and $N_n$ is an integer ≥1 signifying a number of laser pulse(s) per voxel;

a resonant scanning mirror optically coupled to the one or more pulsed laser source(s);

a galvanometer scanning mirror optically coupled to the resonant scanning mirror;

a scan lens optically coupled to the galvanometer scanning mirror;

a dedicated tube lens, comprising three plano-convex lenses, each with an effective focal length of 500 mm, combined together and optically coupled to the scan lens;

a high-NA (numerical aperture) and low magnification objective lens optically coupled to the dedicated tube lens for raster scanning a volumetric tissue-sample and for collecting a sample-generated fluorescence signal which is guided to a photomultiplier tube (PMT) to produce an electrical signal; and a data acquisition system coupled to receive the electrical signal from the PMT with each sampling event synchronized to each optical pulse either from the one pulsed laser source, or from the highest repetition rate pulsed laser source, in case of one, or more pulsed laser source(s), respectively, wherein the scan lens and the dedicated tube lens constitute a beam expander with low magnification, thereby maximizing the field of view (FOV), but concurrently providing an enlarged beam size over a back aperture of the high-NA and low magnification objective lens to maintain high excitation-NA, and thereby high-resolution.

2. A large-angle optical raster scanning system as claimed in claim 1, wherein the data acquisition system enables synchronized sampling with a sampling rate equal to the repetition rate $R_n \geq A_n \times N_n$ of the $n^{th}$ pulsed laser source, i.e., the one pulsed laser source, or the highest repetition rate pulsed laser source, in case of one, or more pulsed laser source(s), respectively, with the each sampling event synchronized to the each optical pulse, thereby achieving a Nyquist-exceeded (exceeding Nyquist Criterion) pixel number to resolve micro-optical resolution across horizontal FOV of >1 mm without shrinking down the FOV size.

3. A large-angle optical raster scanning system as claimed in claim 1, wherein the high-NA and low magnification objective lens is >0.9 in the numerical aperture and ≤20× in an effective magnification.

4. A large-angle optical raster scanning system as claimed in claim 1, wherein the frequency of the resonant scanning mirror is at least 4 kHz.

5. A large-angle optical raster scanning system as claimed in claim 1, wherein the resonant scanning mirror provides a clear aperture of 12 mm×9.25 mm, which is overfilled with the input one or more laser beams to maximize a scanning beam size.

6. A large-angle optical raster scanning system as claimed in claim 1, wherein a first pulsed laser source operates at a repetition rate of 70 MHz centered at 1070 nm and a second pulsed laser source operates at a repetition rate of 95 MHz centered at 1260 nm.

7. A large-angle optical raster scanning system as claimed in claim 1, wherein the dedicated tube lens comprises the three plano-convex lenses combined together, each having an effective focal length of 500 mm, resulting in a combined effective focal length of 166.7 mm, and providing a large clear aperture of >60 mm in diameter for supporting large scanning angle by the resonant scanning mirror and the galvanometer scanning mirror.

8. A large-angle optical raster scanning system as claimed in claim 1, wherein the scan lens and the dedicated tube lens with effective focal lengths of 110 mm and 166.7 mm, respectively, constitute a low magnification relay system with magnification of 1.515, thereby providing a scanning angle of up to ~±7.16° on the back aperture of the high-NA and low magnification objective lens with a scanning angle of up to ~±10.8° over the scan lens, and hence the square and circular field of view (FOV) of up to 1.6×1.6 mm$^2$ and 2.26 mm in diameter, respectively, but concurrently providing an enlarged beam size of >14 mm (up to 18 mm) over the back aperture of the high-NA and low magnification objective lens (NA>0.9), thereby providing high-resolution.

9. A large-angle optical raster scanning system as claimed in claim 1, wherein an input beam at $\lambda$=1070 nm with a diameter of 9.25 mm and the high-NA and low magnification objective lens simulated as a paraxial lens, produce root mean square (RMS) wavefront errors (without defocus) and Strehl Ratios to be <0.07$\lambda$ and >80%, respectively, for 0° and ±7.7° off-axis configurations (over the scan lens) in X and Y directions, confirming a diffraction-limited performance at edge-centers of the FOV of 1.6×1.6 mm$^2$, indicating >78% of the FOV, i.e., $\pi \times 0.8^2$ mm$^2$=2.01 mm$^2$ circular-FOV out of 1.6×1.6 mm$^2$=2.56 mm$^2$ square-FOV, to be diffraction-limited (Marechal Criterion).

10. A large-angle optical raster scanning system as claimed in claim 1, wherein an input beam at $\lambda$=1070 nm with a diameter of 9.25 mm and the high-NA and low magnification objective lens simulated as a paraxial lens, produce RMS wavefront errors (without defocus) at a fixed image plane simultaneously for all configurations of 0° and ±7.7° off-axis over the scan lens in both X and Y directions to be under 0.1$\lambda$, concluding a low field curvature of the system.

11. A large-angle optical raster scanning system of claim 1, wherein efficient collection of the fluorescence signal is achieved by a relay system with a demagnification factor of 3.75, resulting in a ~4 mm focused spot diameter to be inside a photosensitive area of the PMT.

12. A large-angle optical raster scanning system as claimed in claim 1, wherein a first turning mirror and a second turning mirror are optically coupled to the scan lens, the dedicated tube lens is optically coupled to the second turning mirror, a third turning mirror is optically coupled to the dedicated tube lens, and the high-NA and low magnification objective lens is optically coupled to the third turning mirror to achieve a portable form factor.

13. A large-angle optical raster scanning system as claimed in claim 1, further comprising sequentially a dichroic beam splitter, a bi-convex, a fourth turning mirror, a fifth turning mirror, and a plano-convex lens between the back aperture of the high-NA and low magnification objective lens and the photomultiplier tube (PMT).

14. A large-angle optical raster scanning system as claimed in claim 1, wherein to exceed the requirement for the Nyquist Criterion for complete FOV with a sub-micron lateral optical resolution, the data acquisition system provides capability of simultaneously sampling 4 channels at up to a 125 M samples per second sampling rate, with ability of data acquisition, transfer, processing, previewing and storing of 16-bit raw data with 14-bit resolution for 4 channels simultaneously, and reaching a single-frame pixel number of 15720×16000 (×4 channels), and leading to ~1 Gigapixels per frame acquisition, while maintaining ~0.5 fps.

15. A large-angle optical raster scanning system as claimed in claim 1, wherein an acquisition speed of the data acquisition system is maximized at 70 M samples per second by means of the one pulsed laser source pulsing at 70 MHz repetition rate, with synchronized sampling of 1 voxel per optical pulse, with the ability of scanning a 1.6×1.6×1.6 mm$^3$ volume, with 8800×8800×2000 (×4 channels), i.e., 619.52 Giga-voxels, capturing ~1.13 Terabyte of 16-bit raw data with 14-bit resolution in <39 minutes at 0.8 µm Z-steps, and maintaining a Nyquist-exceeded voxel-size, a Nyquist-exceeded volume-scanning speed and a Nyquist-exceeded line-scanning speed of <27 attoliter, >1750 µm$^3$/ms and >12 mm/ms, while maintaining an effective pixel dwell time of <40 ns, at up to an effective lateral resolution of <500 nm.

16. A large-angle optical raster scanning system as claimed in claim 1, wherein an acquisition speed of the data acquisition system is maximized at 95 M samples per second by means of the one pulsed laser source pulsing at 95 MHz repetition rate, with synchronized sampling of 1 voxel per optical pulse, with the ability of scanning a 1.6×1.6×1.6 mm$^3$ volume, with 12000×12000×2000 (×4 channels), i.e., 1.152 Tera-voxels, capturing ~2.1 Terabyte of 16-bit raw data with 14-bit resolution in <53 minutes at 0.8 µm Z-steps, and maintaining a Nyquist-exceeded voxel-size, a Nyquist-exceeded volume-scanning speed and a Nyquist-exceeded line-scanning speed of <15 attoliter, >1288 µm$^3$/ms and >12 mm/ms, while maintaining an effective pixel dwell time of <35 ns, at up to an effective lateral resolution of <420 nm.

17. A large-angle optical raster scanning system as claimed in claim 1, wherein the data acquisition system further comprises a multithreaded control algorithm for synchronization of slow Y-axis scanning by the galvanometer scanning mirror (maintaining 16-bit precision movement) with fast X-axis scanning by the resonant scanning mirror, without sending external electrical frame-trigger signals after completion of each frame, thereby reaching a resonant scanner limited frame rate of ~983 fps with 15720×8 (×4 channels) voxels per frame.

18. A large-angle optical raster scanning system as claimed in claim 1, wherein effective two-photon lateral and axial resolutions resolved by the full-field (without shrinking down the FOV) Nyquist-exceeded sampling are <0.5 µm and <2 µm, respectively, resulting in an effective 3D resolution of <0.5 femtoliter, with a standard deviation and a standard error of the mean for the lateral resolution to be <0.04 µm and <0.007 µm, respectively and for the axial resolution to be <0.31 µm and <0.061 µm, respectively.

19. A large-angle optical raster scanning system as claimed in claim 17, wherein the data acquisition system enables GPU-accelerated real-time calibrations to correct distortions along the fast X-axis caused by a nonlinear speed profile of the resonant scanning mirror.

* * * * *